(12) United States Patent
Horstman et al.

(10) Patent No.: US 8,016,650 B2
(45) Date of Patent: Sep. 13, 2011

(54) ADJUSTABLE CABIN NOZZLE

(75) Inventors: Raymond H. Horstman, Snohomish, WA (US); Scott W. Bohm, Kent, WA (US); Kenneth J. Walter, Kent, WA (US); Steven L. Williams, Seattle, WA (US); Kirk D. Skaggs, Federal Way, WA (US); John M. Brown, Kent, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1309 days.

(21) Appl. No.: 11/609,474

(22) Filed: Dec. 12, 2006

(65) Prior Publication Data

US 2008/0139100 A1    Jun. 12, 2008

(51) Int. Cl.
*F24F 9/00* (2006.01)
(52) U.S. Cl. .......................................... 454/76
(58) Field of Classification Search .......... 454/76, 454/71; 261/141; 98/1; 244/118.5; 95/273
See application file for complete search history.

(56) References Cited

U.S. PATENT DOCUMENTS

| | | | |
|---|---|---|---|
| 3,145,642 A | | 8/1964 | Radcliff |
| 3,687,054 A | * | 8/1972 | Boberg ........................... 454/76 |
| 5,556,335 A | * | 9/1996 | Holyoake ..................... 454/258 |
| 6,749,124 B2 | * | 6/2004 | Weiss ............................ 236/1 G |

* cited by examiner

*Primary Examiner* — Steven B McAllister
*Assistant Examiner* — Samantha A Miller
(74) *Attorney, Agent, or Firm* — Yee & Associates, P.C.

(57) ABSTRACT

An aircraft air distribution system includes a base and first and second arrays of nozzle air transfer ports in the base. An adjustable flow plate is positioned over the nozzle air transfer ports. A compressible member is located between the base and the adjustable flow plate and between the first and second arrays. First and second air ejector regions are located, respectively, on the sides of the compressible member between the base and the adjustable flow plate to connect to the first and second arrays, and direct air from the first and second arrays from the sides of the base. Fasteners moveably connect the adjustable flow plate to the base and are adjustable to change a size of different sections of the first and second air ejector regions to change an amount of airflow originating from the different sections of these regions.

19 Claims, 6 Drawing Sheets

ABSTRACT

ADJUSTABLE CABIN NOZZLE

FEDERALLY SPONSORED RESEARCH OR DEVELOPMENT

This invention was made with Government support under contract F19628-01-D-0016, DO 022, 025-030, awarded by the United States Air Force. The Government has certain rights in this invention.

BACKGROUND INFORMATION

1. Field of Invention

The present invention relates generally to an apparatus for supplying air to an enclosed space and in particular to an apparatus using a nozzle to supply air to an enclosed space. Still more particularly, the present invention relates to an air supply apparatus that supplies air through a nozzle at different rates in different locations within a cabin in an aircraft.

2. Background Description

Cabin air systems for aircraft are designed to provide a safe and comfortable cabin environment at different altitudes. At high altitudes, the passenger cabin is pressurized to enable occupants to breathe normally. Further, the cabin air systems are also designed to provide cooling for equipment that may be located within the passenger cabin.

The passenger cabins for specialized aircraft typically have large concentrated heat loads due to electronic equipment located within the passenger cabin. The size and location of the heat load is often different between aircraft of the same type because of configuration changes over time and varying customer requirements. If the cooling air within the passenger cabin is not properly distributed, a failure of electronic components may occur. Additionally, occupant discomfort and distraction due to overheating hot and cold spots also may occur.

Aircraft with high heat loads require customized cabin air systems to distribute air in a manner that provides sufficient cooling to heat loads and does not result in hot and cold spots in the passenger cabins. Currently, when an aircraft is being designed for a specialized use, an identification of locations for heat generating equipment and occupants are specified. With this specification of heat loads and occupants, an air distribution system is custom designed for that particular aircraft. Nozzles for an air distribution duct running along the length of the passenger cabin are designed to provide the appropriate airflow to maintain a uniform temperature within different locations of the passenger cabin.

This type of solution works well unless a reconfiguration of the aircraft occurs after the aircraft has been constructed. With such a change, the cabin air system may no longer provide uniform temperatures within the passenger cabin because of changes in the location or size of heat loads within the passenger cabin. If the system is unable to maintain a uniform temperature within the passenger cabin, a new set of nozzles must be designed to replace the original nozzle system. These types of changes are expensive and time consuming.

Different control zones may be used to meet temperature uniformity. This type of system, however, is often uneconomical because of the number of control zones that would be needed to maintain temperature uniformity.

Another currently used solution provides a separate cooling system for the heat loads. This type of solution, however, results in an underutilized air distribution system. Further, additional weight and energy use occurs when using a separate cooling system for these heat loads. Therefore, it would be advantageous to have an improved cabin air supply system.

SUMMARY OF THE INVENTION

An embodiment of the present invention provides an aircraft air distribution system. The aircraft air distribution system includes a base section having a first side and a second side, a first array of nozzle air transfer ports formed in the base section, and a second array of nozzle air transfer ports formed in the base section. In addition, the aircraft air distribution system has an adjustable flow plate, wherein the adjustable flow plate is positioned over the first array of nozzle air transfer ports and the second array of air transfer ports. Also, a compressible member is located between the base section and the adjustable flow plate and between the first array of nozzle air transfer ports and the second array of nozzle air transfer ports. The aircraft air distribution system also includes a first air ejector region located on a first side of the compressible member between the base section and the adjustable flow plate, wherein the first air ejector region connects to the first array of nozzle air transfer ports and directs air from the first array of air nozzle transfer ports in a first direction from a first side of the base section. In addition, a second air ejector region is located on a second side of the compressible member between the base section and the adjustable flow plate, wherein the second air ejector region connects to the second array of nozzle air transfer ports and directs air from the second array of air nozzle transfer ports in a section direction from a second side of the base section. A plurality of fasteners is also included in the aircraft air distribution system. The plurality of fasteners moveably connect the adjustable flow plate to the base section, wherein plurality of fasteners are adjustable to change a size of different sections of the first air ejector region and to change a size of different sections of the second air ejector region to change an amount of airflow originating from the different sections of the first air ejector region and from the different sections of the second air ejector region.

Another advantageous embodiment of the present invention provides an air supply apparatus. The air supply apparatus has a base section having a first channel system supplying air to a first side of the base section and a second a second channel system supplying air to a second side of the base section, and an adjustable cover located over the first channel system and the second channel system. In addition, a compressible member is located between the base section and the adjustable cover and between the first channel system and the second channel system, wherein a first air supply region is formed on the first side and a second air supply region is formed on the second side. A plurality of fasteners is also included in the air supply apparatus, wherein the plurality of fasteners moveably connect the adjustable cover to the base section and wherein the plurality of fasteners are adjusted to vary air flowing from different sections the first air supply region on the first side and the air flowing from different sections in the second air supply region on the second side.

The advantageous embodiments also include a method for supplying air to an enclosed space. Air flow is generated into a nozzle system having a base section having a first channel system supplying air to a first side of the base section and a second channel system supplying air to a second side of the base section. An adjustable cover is located over the first channel system and the second channel system; a compressible member located between the base section and the adjustable cover and between the first channel system and the second channel system, wherein a first air supply region is formed on the first side and a second air supply region is formed on the second side. A plurality of fasteners moveably connected to the adjustable cover to the base section, and the plurality of fasteners may be adjusted to vary air flowing from different sections in the first air supply region on the first side and the air flowing from different sections in the second air supply region on the second side.

The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION OF THE INVENTION

Figure 1:
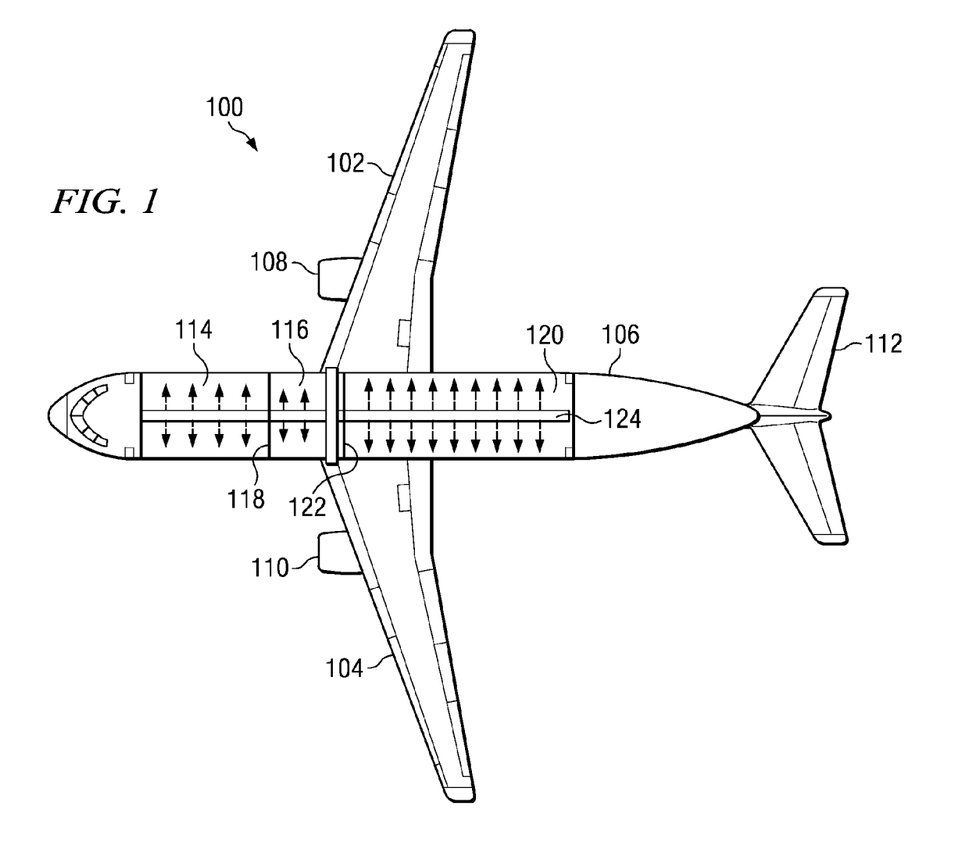
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment the present invention may be implemented. Aircraft 100 is an example of an aircraft in which an aircraft cabin air system using adjustable cabin nozzles may be implemented.

In this illustrative example, aircraft 100 has wings 102 and 104 attached to body 106. Aircraft 100 includes wing mounted engine 108, wing mounted engine 110 and tail 112. The interior cabin of aircraft 100 employs adjustable cabin nozzles in which airflow may be adjusted as configurations or heat sources change within aircraft 100.

In this particular example, the interior cabin in aircraft 100 includes a number of different sections. Section 114 is a moderate and low occupancy area that is separated from section 116 by wall 118. Section 116 is a low occupancy area. Section 120 is separated from section 116 by wall 122. This area within aircraft 100 is a large area that is designed for asymmetrical high occupancy. Air distribution system 124 contains adjustable cabin nozzles such that airflow may be adjusted to provide appropriate cooling in the different sections. More details of air distribution system 124 and the adjustable cabin nozzles are described below.

The advantageous embodiments of the present invention recognize that the current systems used to supply air within a passenger cabin are unable to be adjusted after design or installation to take into account changes in concentrated heat loads within a passenger cabin. The currently used nozzle systems in specialized aircraft are adjusted by replacing parts or entire systems, but are not adjustable during use.

Thus, the advantageous embodiments of the present invention provide an air supply apparatus including a base section having a first channel system supplying air to the first side of the base section and a second channel system supplying air to a second side of the base section. This base section in these examples runs along some or all of the length of the passenger cabin and connects to the air distribution duct for the passenger cabin. Further, the air supply apparatus includes an adjustable cover located over the first channel system and the second channel system. A compressible member is located between the base section and the adjustable cover and between the first channel system and the second channel system, wherein a first supply air region formed on the first side of the base second and a second air supply region is formed on the second side of the base section. Fasteners are used to move or connect the adjustable cover to the base section. These fasteners may be adjusted to vary the air flowing from the different sections of the first air supply region of the first side and the air flowing from the different sections of the second air supply region on the second side.

This apparatus in the depicted embodiments provides a nozzle system that allows for airflow to be adjusted for different sections along the length of the passenger cabin. Additionally, airflow in a section of one side of the passenger cabin may be adjusted to be different airflow on a second side of the same section. Airflow may vary from the maximum airflow provided by the channels to no airflow depending on the size of the air supply regions as adjusted by the fasteners.

In this manner, the air supply apparatus in this illustrative embodiment, provides an ability to adjust airflow in different sections of a passenger cabin and on different sides of the aircraft cabin in the manner to achieve temperatures that are around uniform within the passenger cabin when heat loads and occupants are found or concentrated in different locations within the passenger cabin. In addition, this air supply apparatus may be used to avoid a presence of hot and cold spots within the passenger cabin.

Figure 2:
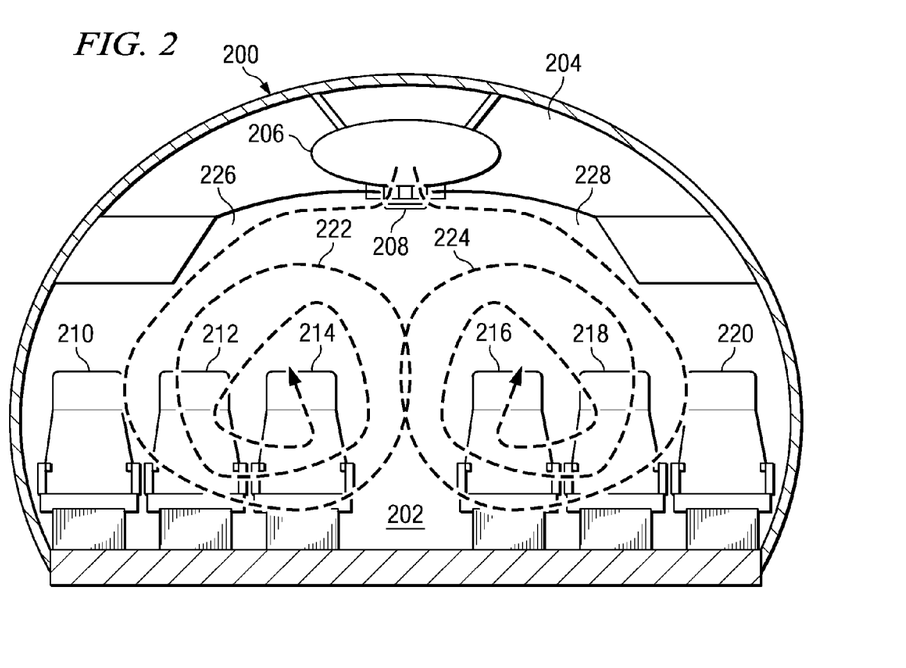
FIG. 2 is a cross-sectional diagram of a section in a passenger cabin in accordance with an advantageous embodiment of the present invention

Turning now to FIG. 2, a cross-sectional diagram of a section in a passenger cabin is depicted in accordance with an advantageous embodiment of the present invention. In this example, aircraft 200 is a cross-sectional view of aircraft 100 in FIG. 1. Passenger cabin 202 is located below crown 204. Air distribution duct 206 is located within crown 204 and supplies air into passenger cabin 202 through adjustable cabin nozzle 208. Adjustable cabin nozzle 208 forms a nozzle system within aircraft 200 to provide for a more uniform distribution of temperatures within passenger cabin 202.

In this example, passenger cabin 202 is configured for occupants in this particular section. Passenger seats 210, 212, 214, 216, 218, and 220 are depicted in this section of passenger cabin 202. Air flows into passenger cabin 202 from air duct 206 through adjustable cabin nozzle 208 as shown by arrows 222 and 224. As can be seen, air flows through adjustable cabin nozzle 208 onto side 226 and side 228 of passenger cabin 202. In these examples, the airflow, as illustrated by arrows 222 and 224, flows in a circular or vortex type pattern.

Figure 3:
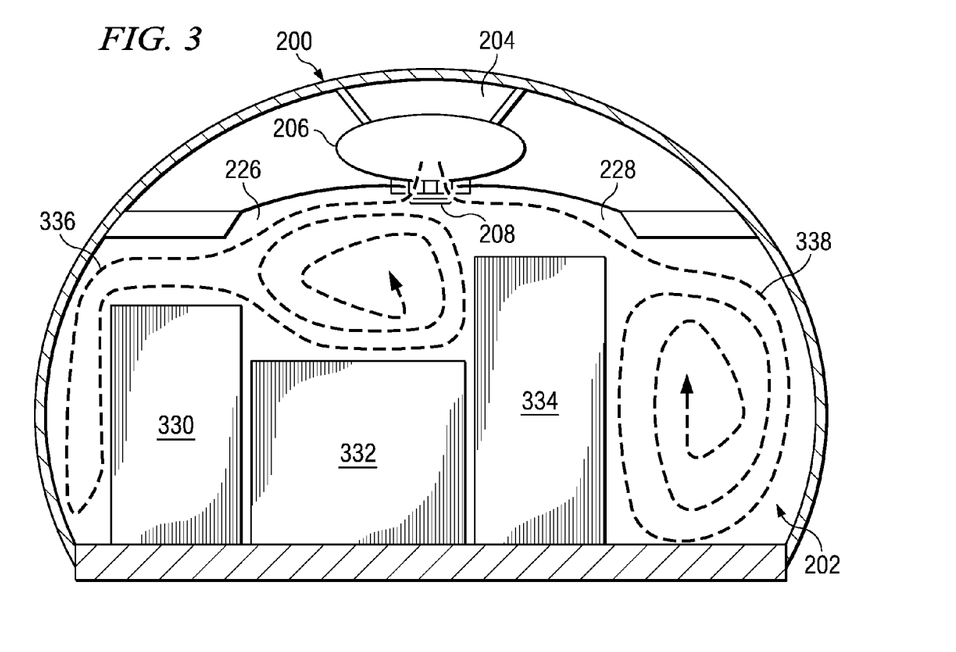
FIG. 3 is a diagram illustrating a portion of a passenger cabin containing heat loads in accordance with an advantageous embodiment of the present invention.

Turning next to FIG. 3, a diagram illustrating a portion of a passenger cabin containing heat loads is depicted in accordance with an advantageous embodiment of the present invention. In this particular example, the airflow patterns are different from those illustrated in FIG. 2 with the presence of heat loads 330, 332, and 334. In these examples, these heat loads take the form of electronic equipment.

The pattern of airflow in this example is shown through arrows 336 and 338. In contrast to the pattern of airflow in FIG. 2, a uniform distribution of air through adjustable cabin nozzle 208 does not result in temperatures that are around uniform within passenger cabin 202. With adjustable cabin nozzle 208, airflow from side 226 and side 228 may be adjusted independently to provide greater airflow to side 226 than side 228 in this example. Further, the airflow in this section of passenger cabin 202 may be varied from the airflow in the other section as illustrated in FIG. 2 through the use of adjustable cabin nozzle to 208.

Figure 4:
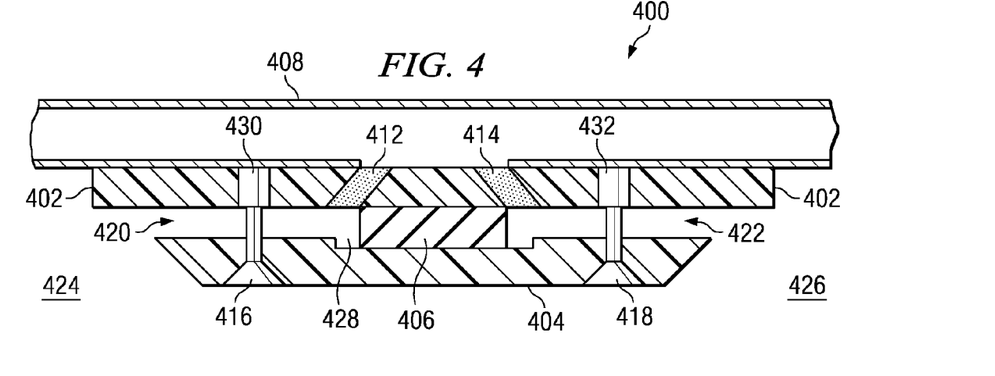
FIG. 4 is a diagram of an adjustable cabin nozzle in accordance with an advantageous embodiment of the present invention.

Turning now to FIG. 4, a diagram of an adjustable cabin nozzle is depicted in accordance with an advantageous embodiment of the present invention. In this example, adjustable cabin nozzle 400 is an example of adjustable cabin nozzle 208 in FIG. 2. Adjustable cabin nozzle 400 includes base mounting plate 402, adjustable flow control plate 404, and compressible elastomer 406. Base mounting plate 402 is attached to air distribution duct 408 in the depicted embodiment.

In these examples, base mounting plate 402 and adjustable flow control plate 404 may be made using different materials. For example, the materials may be metal or plastic. Depending on the implementation, aluminum may be used for this particular component. In the illustrative examples, base mounting plate 402 and adjustable flow control plate 404 is made from a laminated plastic. The plastic may be fabricated through a compression mold, transfer mold or extruded depending on the implementation.

Compressible elastomer 406 may be made from a number of different materials, such as a eurethane foam or sheet compound. Eurethane is also referred to as "urethane". Additionally, metallic or non-metallic springs may also be used in compressible elastomer 406. Any compressible natural or synthetic elastomeric compound satisfying the compressibility and spring rate may be implemented. Additionally, fire retardant requirements may come into play for selecting these materials.

Although base mounting plate 402 is depicted as being mounted or attached to a surface of air distribution duct 408, the depicted manner of attachment in this figure is not meant to limit the manner in which base mounting plate 402 may be coupled or attached to air distribution duct 408. For example, base mounting plate 402 may be configured or shaped to fit within a gap in air distribution duct 408.

Base mounting plate 402 contains nozzle air transfer ports 412 and 414. Although only two nozzle air transfer ports are illustrated in this cross-sectional view, two arrays of nozzle air transfer ports are present in the illustrative embodiments.

Compressible elastomer 406 is located between nozzle air transfer ports 412 and 414. Additionally, compressible elastomer 406 is located between base mounting plate 402 and adjustable flow control plate 404.

Compressible elastomer 406 is compressible to allow adjustable flow control plate 404 to move towards and away from base mounting plate 402. Compressible elastomer 406 provides a spring force or push against adjustable flow plate 404 in these examples. Compressible elastomer 406 is used, in this example, to divide the different sides of the cabin and is made from the material that allows for the component to be compressed.

In these illustrative examples, compressible elastomer 406 may be made from different materials. In these examples, compressible elastomer 406 may be made from a silicon rubber sheet having a selected thickness. Thickness may vary depending on the particular implementation.

In these examples, base mounting plate 402 and adjustable flow control plate 404 may be made from different materials. These materials may include, for example, a nylon compound, a protruded thermal epoxy/fiberglass, or any plastic metallic material that satisfies structural and fire retardant requirements of the vehicle in which the adjustable cabin nozzle is being used.

Adjustable flow control plate 404 is moveably connected to base mounting plate 402 through adjusting devices 416 and 418. Again, although only two adjusting devices are illustrated, two arrays of the adjusting devices are employed in these illustrative examples to allow for different configurations within different sections within the passenger cabin.

Air injector region 420 and air injector region 422 are present in a space around base plate 402, adjustable flow control plate 404, and compressible elastomer 406. Air injector region 420 connects to or couples to nozzle air transfer port 412. Air injector region 422 connects to or couples to nozzle air transfer port 414. In this manner, air may travel through air distribution duct 408 into nozzle air transfer port 412 and through air injector region 420 into side 424 of the passenger cabin. Air also may flow from air distribution duct 408 through nozzle air transfer port 414 into air injector region 422 to provide airflow into side 426 of the passenger cabin of these examples.

As depicted, adjustable flow control plate 404 contains groove 428. This groove allows for air injector region 420 and air injector region 422 to be entirely closed off. Groove 428 allows for compressible elastomer 406 to compress in a fashion to allow closing off air injector regions 420 and 422.

In other words, adjustable flow control plate 404 may be moved towards base mounting plate 402 in a manner such that adjustable flow control plate 404 contacts base mounting plate 402, eliminating air injector region 420 and air injection region 422.

In these examples, fastener inserts 430 and 432 provide a locking feature to prevent fasteners, such as adjusting device 416 and 418 from backing out due to vibration. This feature allows for adjustable flow control plate 404 to remain in a selected position after adjustment when vibrations occur.

In these examples, air injector region 420 and air injector region 422 also may be adjusted independently of each other. For example, the adjustments may be such that side 424 receives more airflow than side 426.

Figure 5:
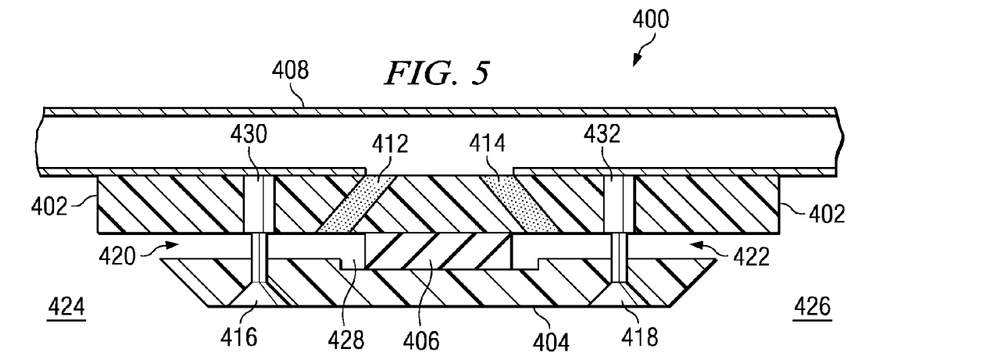
FIG. 5 is a cross-sectional view of a generic nozzle configuration in accordance with an advantageous embodiment of the present invention.

Turning to FIGS. 5-10 illustrate different configurations for adjustable cabin nozzle 400 in FIG. 4. With reference first to FIG. 5, a cross-sectional view of a generic nozzle configuration is depicted in accordance with an advantageous embodiment of the present invention. In this example, air injector regions 420 and 422 are set in a manner that they both have equal airflow.

Figure 6:
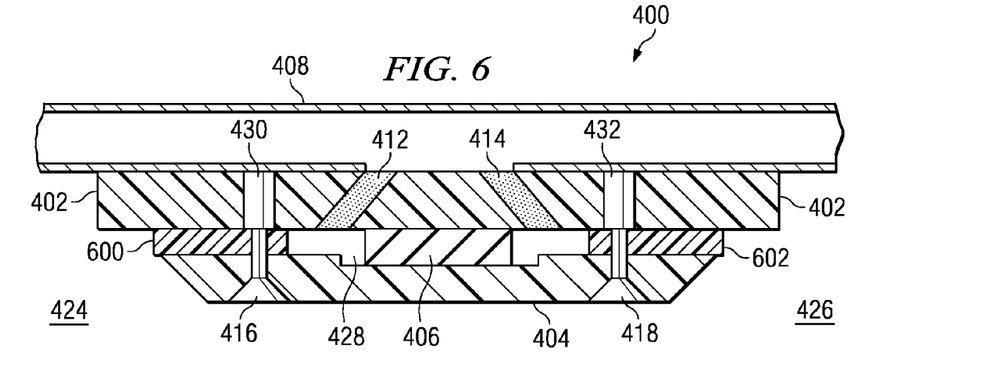
FIG. 6 is a cross-sectional view of a gauged opening in an adjustable cabin nozzle in accordance with an advantageous embodiment of the present invention.

Turning next to FIG. 6, a cross-sectional view of a gauged opening in an adjustable cabin nozzle is depicted in accordance with an advantageous embodiment of the present invention. In this particular example, shim blocks 600 and 602 are placed into air injector regions 420 and 422. These shim blocks may be placed next to adjusting device 416 and 418 respectively. Alternatively, adjusting device 416 and adjusting device 418 may pass through shim blocks 600 and 602. These blocks provide for additional precision in setting the size of air injector region 420 and air injector region 422.

Figure 7:
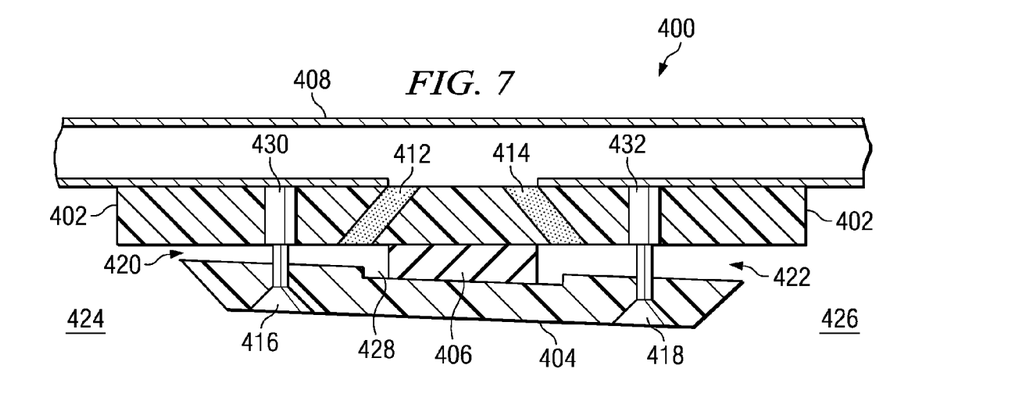
FIG. 7 is a cross-sectional view of a adjustable cabin nozzle set for left-right differential flow in accordance with advantageous embodiment of the present invention.

With reference to FIG. 7, a cross-sectional view of a adjustable cabin nozzle set for left-right differential flow is depicted in accordance with advantageous embodiment of the present invention. As can be seen in this example, adjustable flow control plate 404 has been set such that air injector region 420 is smaller in size than air injector region 422. This type of setting results in more air being distributed on to side 426, the right side, as opposed to side 424, the left side, in these examples.

Figure 8:
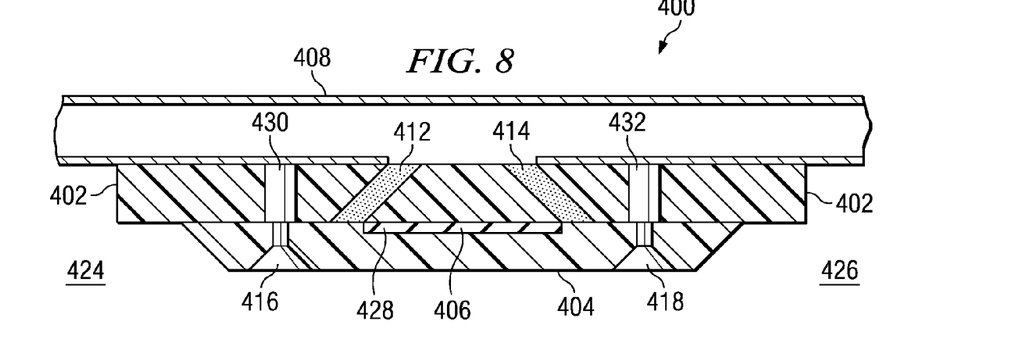
FIG. 8 is a cross-sectional view of an air cabin nozzle in which air flow is eliminated in accordance with an advantageous embodiment of the present invention.

Turning now to FIG. 8, a cross-sectional view of an air cabin nozzle in which air flow is eliminated is depicted in accordance with an advantageous embodiment of the present invention. In these examples, air injector regions are absent in adjustable cabin nozzle 400. Adjusting devices 416 and 418 have been adjusted in a manner that adjustable flow control plate 404 now contacts base mounting plate 402 cutting off airflow from nozzle air transfer ports 412 and 414.

Figure 9:
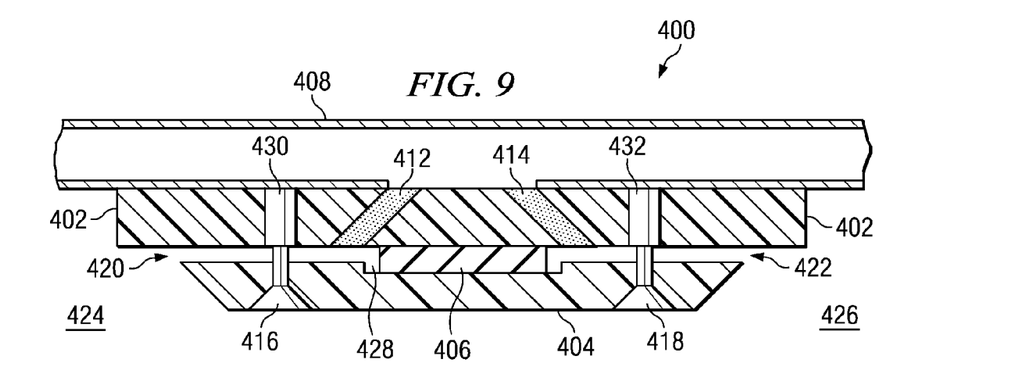
FIG. 9 is a cross-sectional view of an adjustable cabin nozzle in accordance with an advantageous embodiment of the present invention.

With reference next to FIG. 9, a cross-sectional view of an adjustable cabin nozzle is depicted in accordance with an advantageous embodiment of the present invention. In this example, both air injector region 420 and air injector region 422 have been reduced in size relative to the configuration shown in FIG. 5. The overall air flow has been reduced for both side 424 and side 426 of the passenger cabin.

Figure 10:
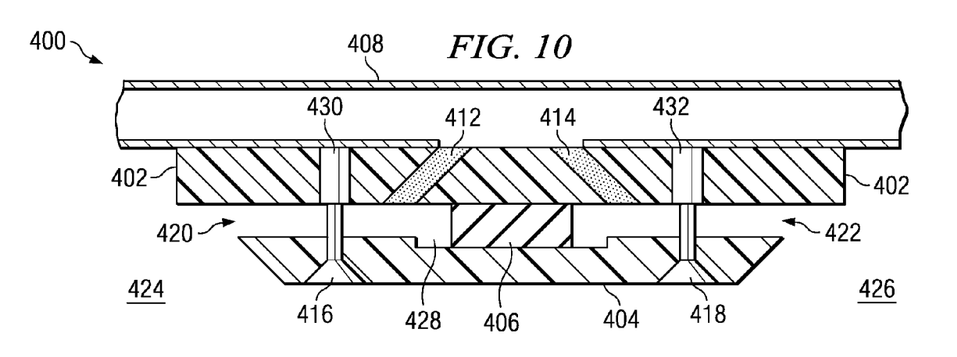
FIG. 10 is a cross-sectional view of an adjustable cabin nozzle adjusted for an increase in airflow in accordance with an advantageous embodiment of the present invention.

With reference now to FIG. 10, a cross-sectional view of an adjustable cabin nozzle adjusted for an increase in airflow is depicted in accordance with an advantageous embodiment of the present invention. In this depicted example, air injector region 420 and air injector region 422 have been increased in size to increase the airflow from air distribution duct 408 into the passenger cabin.

As can be seen in these examples, compressible elastomer 406 provides an ability to adjust the airflow differently between side 424 and side 426. Further, this component also allows for different flows to occur in different sections. For example, the cross-section illustrated in FIG. 5 may be located forward relative to the cross-section illustrated in FIG. 9. Compressible elastomer 406 provides the ability to change the size of the air injector regions along different sections of a passenger cabin.

Figure 11:
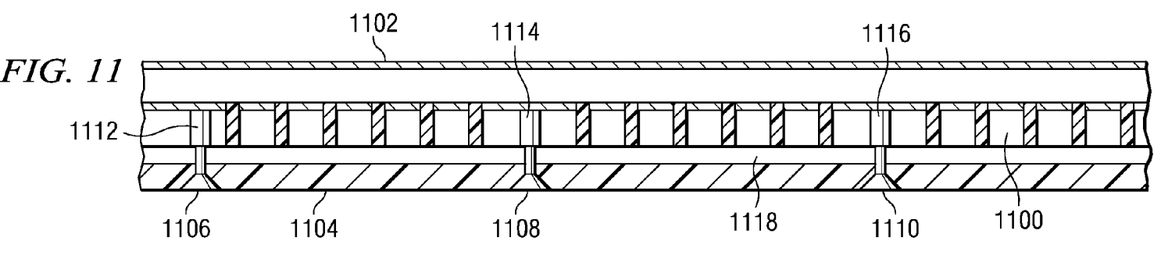
FIG. 11 is a side cross-sectional view of an adjustable cabin nozzle in accordance with an advantageous embodiment of the present invention.

Turning now to FIG. 11, a side cross-sectional view of an adjustable cabin nozzle is depicted in accordance with an advantageous embodiment of the present invention. In this example, base mounting plate 1100 is connected to air delivery duct 1102. Adjustable flow control plate 1104 is movably mounted to base mounting plate 1100 through adjusting devices 1106, 1108, and 1110. As with the other illustrations, fastener inserts 1112, 1114, and 1116 are used with adjusting devices 1106, 1108, and 1110, respectively. Compressible elastomer 1118 is located between base mounting plate 1100 and adjustable flow control plate 1104. In this example, the configuration is a general configuration that provides for an even airflow along the length of the passenger cabin in the aircraft.

Figure 12:
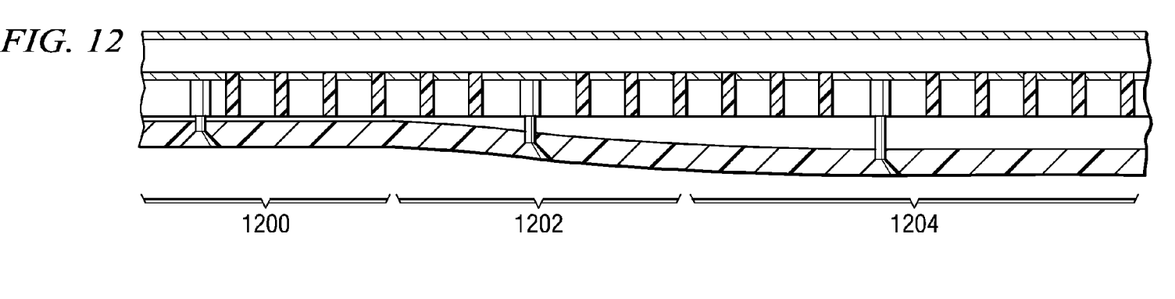
FIG. 12 is a side cross-sectional view of a adjustable cabin nozzle with variable airflow in accordance with an advantageous embodiment of the present invention.

Turning now to FIG. 12, a side cross-sectional view of a adjustable cabin nozzle with variable airflow is depicted in accordance with an advantageous embodiment of the present invention. In this illustrative example, section 1200 has been adjusted such that the airflow from the air injector region is less than that in section 1202. Section 1202 illustrates an increasing a size of the air injector region, resulting in increasing airflow. Section 1204 illustrates a greater amount of airflow with respect to sections 1200 and 1202. In this manner, airflow for different sections of a passenger cabin may be adjusted based on heat load size and location and expected occupant locations.

Figure 13A:
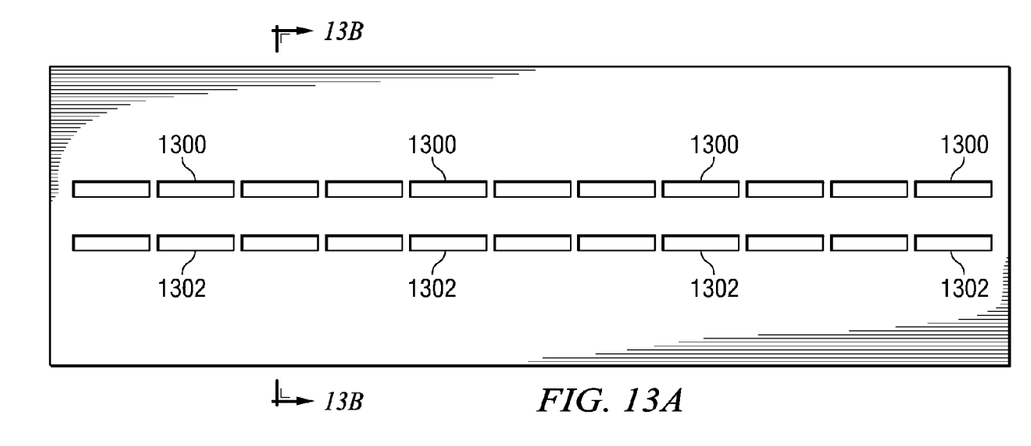
FIGS. 13A and 13B are diagrams illustrating air transfer ports in accordance with an advantageous embodiment of the present invention.
Figure 13B:
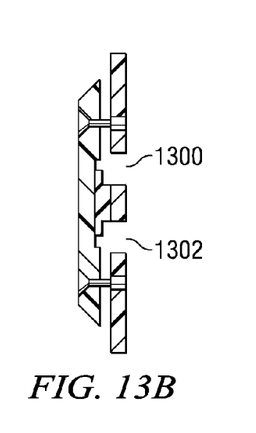

With reference now to FIGS. 13A and 13B, diagrams illustrating air transfer ports are depicted in accordance with an advantageous embodiment of the present invention. In these examples, array 1300 and array 1302 are two arrays of transfer ports that provide air to the two sides of a passenger cabin. These air transfer ports take the form of a slots or rectangular shapes.

Figure 14A:
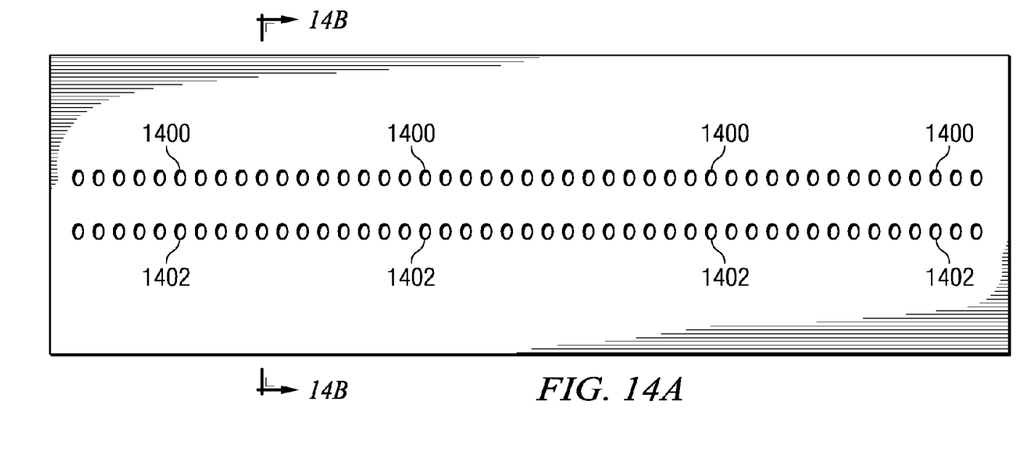
FIGS. 14A and 14B are diagrams illustrating air transfer ports in accordance with an advantageous embodiment of the present invention.
Figure 14B:
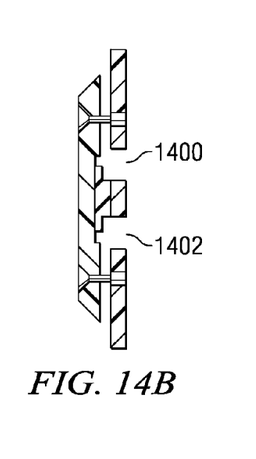

With reference now to FIGS. 14A and 14B, diagrams illustrating air transfer ports are depicted in accordance with an advantageous embodiment of the present invention. In this particular example, array 1400 and array 1402 contain air transfer ports that are used to supply air to different sides of a passenger cabin. In these examples, the air transfer ports are round or oval in shape. FIGS. 13A, 13B, 14A, and 14B are provided to show examples of different types of air transfer ports that may be used with the adjustable cabin nozzle system in the advantageous embodiments of the present invention.

Thus, the different advantageous embodiments of the present invention provide an improved air supply apparatus having a base section, an adjustable cover, a compressible member, and fasteners. In the depicted examples, the base section contains two arrays of channels in which the first array supplies air to the first side, the base section, and a second array supplies air a second side of the base section. The adjustable cover is located over the first and second array of channels. A compressible member is located between the base section and the adjustable cover and the first array of channels and the second array of channels. In this manner, the first air supply region and the second air supply region is formed on the different sides. The fasteners are used to moveably connect the adjustable cover to the base section in which these fasteners may be adjusted to vary air flowing from different sections of the air supply region on the first side and air flowing from the different sections of the air supply region on the second side.

As a result, an air supply system may be placed into an aircraft without requiring prior knowledge of locations and sizes of heat loads and occupants. The different features of the advantageous embodiments provide an ability to adjust the airflow in different sections along the cabin as well as from side to side in the same section. Thus, if changes in design occur or reconfigurations of the aircraft occur, the aircraft air supply system may be adjusted to provide for airflow to maintain temperatures at around the same temperature or a uniform temperature.

The description of the present invention has been presented for purposes of illustration and description, and is not intended to be exhaustive or limited to the invention in the form disclosed. Many modifications and variations will be apparent to those of ordinary skill in the art. Although the depicted embodiments are illustrated for use in a passenger cabin of an aircraft, the different embodiments may be applied to other types of enclosed spaces. For example, the adjustable cabin nozzle may be used in other types of vehicles, such as a bus, a ship, or a submarine. Further, this adjustable nozzle system also may be used inside a building. Further, different advantageous embodiments may provide different advantages as compared to other advantageous embodiments.

The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An aircraft air distribution system comprising:
a base section having a first side and a second side;
a first array of nozzle air transfer ports formed in the base section;
a second array of nozzle air transfer ports formed in the base section;
an adjustable flow plate, the adjustable flow plate is positioned over the first array of nozzle air transfer ports and the second array of air transfer ports;
a compressible member located between base section and the adjustable flow plate and between the first array of nozzle air transfer ports and the second array of nozzle air transfer ports;
a first air ejector region located on a first side of the compressible member between the base section and the adjustable flow plate, wherein the first air ejector region connects to the first array of nozzle air transfer ports and directs air from the first array of air nozzle transfer ports in a first direction from a first side of the base section;
a second air ejector region located on a second side of the compressible member between the base section and the adjustable flow plate, wherein the second air ejector region connects to the second array of nozzle air transfer ports and directs air from the second array of air nozzle transfer ports in a second direction from a second side of the base section;
the adjustable flow plate configured with respect to the base section such that airflow through the first air ejector region is greater than airflow through the second air ejector region; and
a plurality of fasteners, wherein the plurality of fasteners moveably connect the adjustable flow plate to the base section, wherein plurality of fasteners are adjustable to change a size of different sections of the first air ejector region and to change a size of different sections of the second air ejector region to change an amount of airflow originating from the different sections of the first air ejector region and from the different sections of the second air ejector region.

2. The aircraft air distribution system of claim 1, wherein the base section is connected to an air distribution duct in an aircraft.

3. The aircraft air distribution system of claim 1, wherein a first part of the second air ejector region is located on a side opposite to a second part of the first air ejector region.

4. The aircraft air distribution system of claim 1, wherein the amount of airflow is adjustable by adjusting the plurality of fasteners to direct more airflow to a location in the aircraft air distribution system having a higher heat load than to a location having a lower heat load.

5. The aircraft air distribution system of claim 1, wherein the amount of airflow may be adjusted in a selected section of the first air ejector region without adjusting the amount of airflow from the second air ejector region in the selected section.

6. The aircraft air distribution system of claim 1, wherein the compressible member is comprised of an elastomeric compound.

7. The aircraft air distribution system of claim 1, wherein the compressible member is comprised a material selected from eurethane foam, a metallic coil, a leaf spring, or silicone rubber.

8. The aircraft air distribution system of claim 1, wherein the base section and the adjustable flow plate are formed from plastic, nylon, thermoplastic epoxy, fiberglass, or aluminum.

9. The aircraft air distribution system of claim 1, wherein the plurality of fasteners is a plurality of fasteners and further comprising:
a plurality of fastener inserts located in the base section, wherein the plurality of fasteners are placed into the plurality of fastener inserts.

10. The aircraft air distribution system of claim 9, wherein the plurality of fastener inserts include a locking feature to prevent the plurality of fasteners from backing-out in response to vibrations.

11. The aircraft air distribution system according to claim 1 further comprising a groove disposed between the base section and the adjustable flow plate for receiving the compressible member.

12. The aircraft air distribution system according to claim 1, wherein each fastener is configured to move the adjustable flow plate both closer to and away from the base section.

13. The aircraft air distribution system according to claim 1, wherein each fastener may be independently adjusted.

14. The aircraft air distribution system according to claim 1 further comprising at least one shim block disposed in an air injector region.

15. An aircraft air distribution system comprising:
a base section having a first side and a second side;
a first array of nozzle air transfer ports formed in the base section;
a second array of nozzle air transfer ports formed in the base section;
an adjustable flow plate, wherein the adjustable flow plate is positioned over the first array of nozzle air transfer ports and the second array of air transfer ports;
a compressible member located between base section and the adjustable flow plate and between the first array of nozzle air transfer ports and the second array of nozzle air transfer ports;
a first air ejector region located on a first side of the compressible member between the base section and the adjustable flow plate, wherein the first air ejector region connects to the first array of nozzle air transfer ports and directs air from the first array of air nozzle transfer ports in a first direction from a first side of the base section;
a second air ejector region located on a second side of the compressible member between the base section and the adjustable flow plate, wherein the second air ejector region connects to the second array of nozzle air transfer ports and directs air from the second array of air nozzle transfer ports in a second direction from a second side of the base section;
a plurality of fasteners, wherein the plurality of fasteners moveably connect the adjustable flow plate to the base section;

at least one adjusting devices attached to at least one fastener;

wherein plurality of fasteners are adjustable to change a size of different sections of the first air ejector region and to change a size of different sections of the second air ejector region to change an amount of airflow originating from the different sections of the first air ejector region and from the different sections of the second air ejector region; and wherein the adjustable flow plate may be configured with respect to the base section such that air flow through the first air ejector region is greater than airflow through the second air ejector region due to movement of the flow plate relative to the base section.

16. The aircraft air distribution system according to claim 15 further comprising a groove disposed between the base section and the adjustable flow plate for receiving the compressible member.

17. The aircraft air distribution system according to claim 15, wherein each fastener is configured to move the adjustable flow plate both closer to and away from the base section.

18. The aircraft air distribution system according to claim 15, wherein each fastener may be independently adjusted.

19. The aircraft air distribution system according to claim 15 further comprising at least one shim block disposed in an air injector region.

* * * * *